US008593282B2

(12) United States Patent
Scarola et al.

(10) Patent No.: US 8,593,282 B2
(45) Date of Patent: Nov. 26, 2013

(54) RTLS-ENABLED TAG RECLAMATION RECEPTACLE

(75) Inventors: Todd Franklin Scarola, Crozier, VA (US); Lynn Ann DeRose, Gloversville, NY (US); John Michael Lizzi, Jr., Wilton, NY (US); Douglas Roy Forman, Niskayuna, NY (US); Charles Burton Theurer, Alplaus, NY (US); Brandon Stephen Good, Schenectady, NY (US); Francis Christopher Hann, Porter Corners, NY (US)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 12/977,427

(22) Filed: Dec. 23, 2010

(65) Prior Publication Data

US 2012/0050043 A1 Mar. 1, 2012

Related U.S. Application Data

(60) Provisional application No. 61/376,562, filed on Aug. 24, 2010.

(51) Int. Cl.
*G08B 13/14* (2006.01)
*G08B 21/00* (2006.01)
*G08B 23/00* (2006.01)
*H04B 10/00* (2013.01)

(52) U.S. Cl.
USPC .................. 340/572.1; 340/545.6; 340/686.1; 340/686.4; 340/693.5; 398/108

(58) Field of Classification Search
USPC ........................................... 340/572.8, 572.1
See application file for complete search history.

(56) References Cited

U.S. PATENT DOCUMENTS

| 6,759,959 B2 * | 7/2004 | Wildman .................... 340/572.1 |
| 7,167,078 B2 * | 1/2007 | Pourchot ...................... 340/5.61 |
| 7,336,183 B2 * | 2/2008 | Reddy et al. ............... 340/572.3 |
| 2005/0116813 A1 * | 6/2005 | Raskar .......................... 340/10.1 |
| 2005/0156739 A1 * | 7/2005 | Maloney .................... 340/572.1 |
| 2006/0091295 A1 * | 5/2006 | Staples .................. 250/214 SW |

(Continued)

FOREIGN PATENT DOCUMENTS

| CN | 201218962 Y | 4/2009 |
| JP | 2003323653 A | 11/2003 |
| KR | 1020060005827 A | 1/2006 |
| WO | 2004104619 A1 | 12/2004 |

OTHER PUBLICATIONS

Search Report from corresponding GB Application No. GB1113589.4 dated Nov. 29, 2011.

*Primary Examiner* — Jennifer Mehmood
*Assistant Examiner* — John Mortell
(74) *Attorney, Agent, or Firm* — Fletcher Yoder, P.C.

(57) ABSTRACT

Techniques are provided for reducing the transmission of infrared (IR) signals outside of a reclamation receptacle. Techniques include using a reclamation receptacle having an IR transmitter configured to transmit IR signals when the reclamation receptacle is in a closed configuration and configured to cease transmission of the IR signals when the reclamation receptacle is in an open configuration. A radio frequency identification (RFID) tag may be deposited in the reclamation receptacle. The RFID tag may receive the IR signals and generate a radio frequency (RF) signal in response to the IR signals, wherein the RF signal indicates that the RFID tag is in the reclamation receptacle.

21 Claims, 7 Drawing Sheets

(56) References Cited

U.S. PATENT DOCUMENTS

2006/0220842 A1* 10/2006 Breed .................. 340/539.13
2007/0250413 A1* 10/2007 Godlewski .................. 705/28
2009/0192764 A1* 7/2009 Radcliff .................. 702/188
2009/0248500 A1* 10/2009 Centner et al. .................. 705/13
2010/0164710 A1* 7/2010 Chung et al. ............... 340/539.1
2010/0204999 A1* 8/2010 Scarola ............................ 705/2
2010/0265068 A1* 10/2010 Brackmann et al. ........ 340/572.1

* cited by examiner

RTLS-ENABLED TAG RECLAMATION RECEPTACLE

CROSS-REFERENCE TO RELATED APPLICATIONS

This application claims the benefit of U.S. Provisional Patent Application No. 61/376,562, entitled "RTLS-Enabled Tag Reclamation Receptacle," and filed Aug. 24, 2010, which is herein incorporated by reference.

BACKGROUND OF THE INVENTION

The subject matter disclosed herein generally relates to tracking locations of patients, equipment, and staff in a facility.

To track locations of patients, equipment, and staff, a medical facility may employ one of many available location tracking systems. One example of such a system may be a real-time location system (RTLS) which may generate location information in real time. Generally, RTLS-generated location information may be provided in real time using any number of real-time tracking methods, such as tracking the location of radio frequency identification (RFID) or infrared (IR) tags associated with patients, equipment, or staff.

A typical RTLS in a medical facility may associate a tag with an object (e.g., a person, medical equipment, and the like) and determine the location of the object by tracking the location of the tag. For example, a tag may be attached or embedded to an object and may transmit wireless signals. The wireless signals may be received by one or more detectors positioned throughout the medical facility, and the RTLS may determine the location of the tag, and the location of the corresponding object, based on the signal received by the detectors and the known position of the detectors.

Throughout typical operations in the medical facility, the tags may regularly be returned and/or recycled. For example, when a patient is discharged from the medical facility, or when a patient is transported from one wing of a hospital to another, the patient's tag may be returned. Similarly, when medical equipment is moved throughout the medical facility or moved out of the medical facility, a tag associated with the equipment may be returned. Some current techniques involve collecting tags in containers or boxes. An IR transmitter in the collection container may transmit an IR signal to the collected tags, and in response, the tags generate a radio frequency (RF) signal to indicate its return to a collection container. However, such techniques may be inadequate and may result in inaccuracies in distinguishing between returned and circulating tags.

BRIEF DESCRIPTION OF THE INVENTION

One embodiment includes a system including a reclamation receptacle and a radio frequency identification (RFID) tag. The reclamation receptacle includes an infrared (IR) transmitter configured to transmit IR signals when the reclamation receptacle is in a closed configuration and configured to cease transmission of the IR signals when the reclamation receptacle is in an open configuration. The RFID tag is configured to fit in the reclamation receptacle and receive the IR signals to generate a radio frequency (RF) signal in response to the IR signals. The RF signal indicates that the RFID tag is in the reclamation receptacle.

Another embodiment includes a reclamation receptacle including a bin configured to contain one or more radio frequency identification (RFID) tags and a lid removably coupled to the bin. The reclamation receptacle also includes an infrared (IR) transmitter configured to activate when the bin is coupled to the lid and configured to deactivate when the bin is removed from the lid. Further, the reclamation receptacle includes a sensor configured to sense when the bin is coupled to the lid and sense when the bin is removed from the lid.

Yet another embodiment provides a method including receiving a radio frequency identification (RFID) tag at a reclamation receptacle and transmitting infrared (IR) signals from an IR transmitter within the reclamation receptacle to the received RFID tag. The RFID tag generates a radio frequency (RF) signal based on the received IR signals. The method further includes removing a bin of the reclamation receptacle and sensing the removal of the bin. When the removal of the bin is sensed, the method involves deactivating the IR transmitter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the presently disclosed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present techniques, the articles "a," "an," "the," and "said" are intended to mean that there are one or more of the elements. The terms "comprising," "including," and "having" are intended to be inclusive and mean that there may be additional elements other than the listed elements. Moreover, any use of the terms "top," "bottom," "above," "below," other positional terms, and variations of these terms is made for convenience, but does not require any particular orientation of the described components.

Furthermore, embodiments of the present techniques may involve the tracking of "objects," which may refer to people (e.g., medical facility staff or patients), or objects (e.g., medical equipment or devices). The tracking device associated with an object may be referred to as a "tag," which may include a badge, a wristband, or any other suitable tracking device attached to, or otherwise associated with the object to be tracked.

Techniques are provided for reducing the transmission of infrared (IR) signals outside of a reclamation receptacle. IR signals transmitted within a reclamation receptacle may be reduced by using IR-opaque materials and other configurations designed to reduce the leakage of IR signals. Further, embodiments may include sensing when the reclamation receptacle is open and deactivating an IR transmitter when the reclamation receptacle is open to prevent the IR transmitter from transmitting IR signals out from an open reclamation receptacle. Embodiments may also include reducing and/or preventing IR signals from being transmitted out of the reclamation receptacle to reduce the probability of transmitting IR signals to tags which have not been deposited within the reclamation receptacle, thereby reducing the likelihood of inaccurate location and/or status data associated with such tags.

Figure 1:
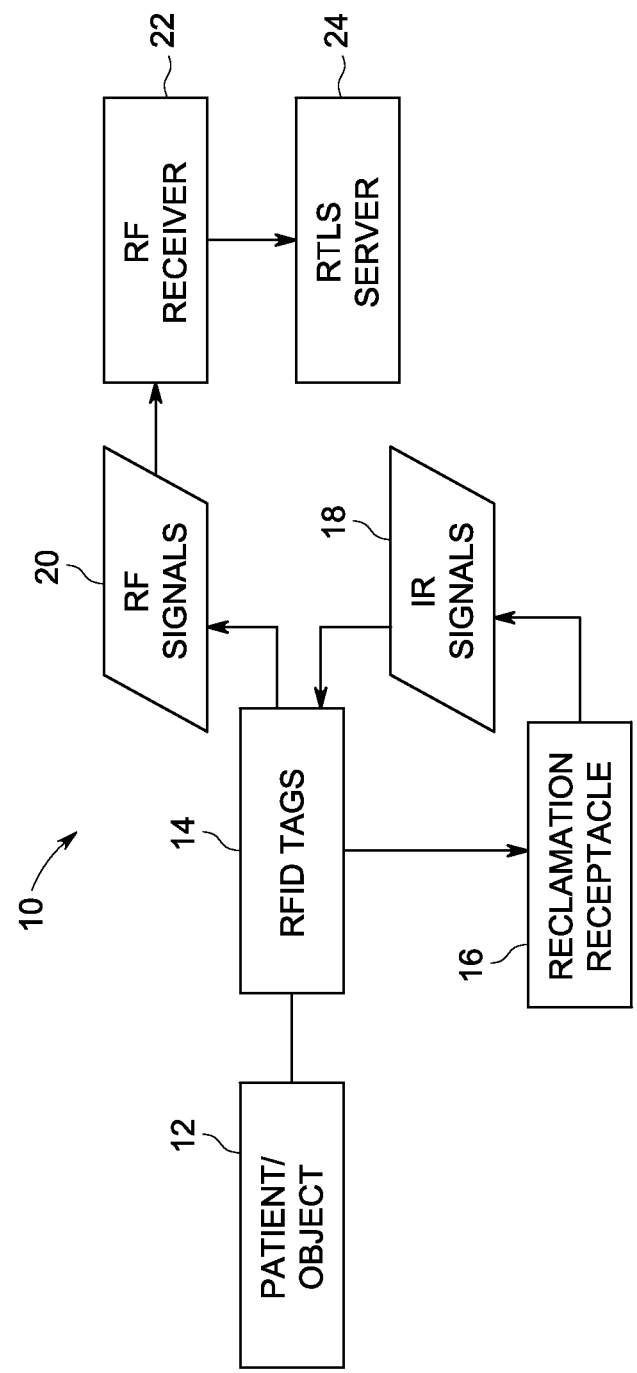
FIG. 1 is a block diagram of a location tracking system for tracking tags and objects in a medical facility in accordance with an embodiment.
Figure 2:
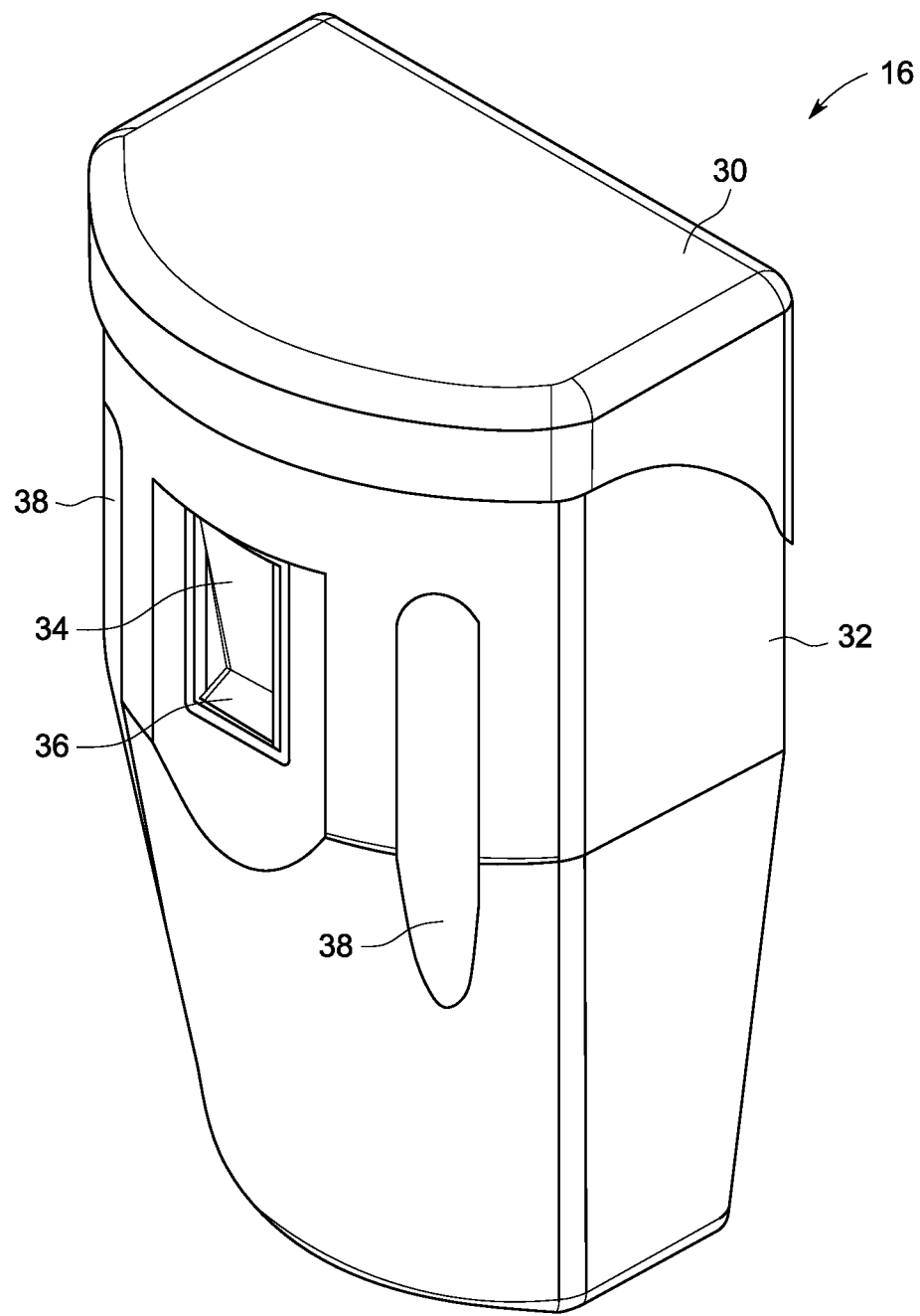
FIG. 2 is an illustration of a reclamation receptacle in accordance with an embodiment.

Turning now to the drawings, FIG. 1 illustrates a system 10 for acquiring and processing location data in accordance with an embodiment. In some embodiments, the system may include one or more real-time location systems (RTLS) 10. In some embodiments, the system 10 may also include or communicate with one or more Health Level Seven (HL7) based location systems and/or other location providers suitable for providing provide location data. Such location data may include raw location information regarding a hardware tag 14 (e.g., a radio frequency identification (RFID) tag) and/or information indicating a location of one or more objects 12 in a medical facility. Generally, such raw location information regarding a tag 14 may correspond to the location of one or more objects 12.

Specifically, the location data from the RTLS system 10 may include a raw data feed of real-time location data and/or location history for one or more RFID tags 14, which may be associated with objects 12, such as patients, equipment, or staff. An RFID tag 14 tracked by the RTLS system 10 may be tracked over radio frequency (RF) spectra including, for example, high frequency (HF) or ultra high frequency (UHF) spectra. For example, the RFID tag 14 may transmit RF signals 20 including real-time location data. The RF signals 20 may be received at an RF receiver 22 of connected to an RTLS server 24 of the system 10. The RTLS server 24 may process the location data and facilitate user interaction with the system 10.

During typical operations of a medical facility, the RFID tags 14 may be placed in circulation and then be collected. For example, a patient 12 may wear an RFID tag 14 (e.g., in a wristband) during his time at a medical facility and may return his tag 14 once his treatment is complete and/or he leaves the medical facility. Similarly, the RFID tag 14 associated with a piece of medical equipment 12 may be returned when the equipment is removed from the medical facility (e.g., transferred to a different facility, removed for servicing, etc.) In some medical facilities, certain types of tags 14 may be used to indicate location in different sections or wings of a medical facility, and movement of objects 12 from a first location to a second location of the medical facility may also result in the return of tags 14 associated with the first location.

In some embodiments, returned RFID tags 14 may be deposited into a reclamation receptacle 16. One portion of the reclamation receptacle 16 may be in the form of a bin (e.g., a container, drawer, or box, etc.), and in some embodiments, an RTLS system 10 may include one or more reclamation receptacles 16 positioned throughout a medical facility. For example, a reclamation receptacle 16 may be placed in each patient room, in each hallway, and/or in locations throughout various sections of a medical facility. An RFID tag 14 may be physically removed or detached from an object 12 and deposited in a reclamation receptacle 16, such as when a patient associated with the tag 14 is discharged or when a piece of equipment associated with the tag 14 is moved.

Once an RFID tag 14 is deposited in a reclamation receptacle 16, the RFID tag 14 may send a signal to indicate its return. In some embodiments, a reclamation receptacle 16 may cause the tag(s) 14 deposited in the reclamation receptacle 16 to generate such a signal. For example, the reclamation receptacle 16 may be constantly transmitting infrared (IR) signals 18 within a contained volume of the reclamation receptacle 16. The IR signals 18 may be received by RFID tags 14 deposited into the contained volume of the reclamation receptacle 16. In response to the received IR signals 18, the RFID tags 14 may generate an RF signal 20 indicative of the deposit of the tag 14 to a reclamation receptacle 16. In some embodiments, the IR signals 18 transmitted by each reclamation receptacle 16 may be different and may be indicative of a particular reclamation receptacle 16 in the medical facility. The unique IR signals 18 may affect the generation of RF signals 20 by the RFID tags 14. For example, the RFID tags 14 may be configured to receive different unique IR signals 18 transmitted by different reclamation receptacles 16 and may generate unique RF signals 20 to indicate in which reclamation receptacle 16 the tag 14 has been deposited.

The RF signals 20 generally may be received by an RF receiver 22 of the system. The RF receiver 22 may filter, amplify, and/or otherwise process the received RF signals 20 and transmit the signals 20 to an RTLS server 24. The RTLS server 24 may further process the RF signals 20 indicating a deposit of the tag 14 to a reclamation receptacle 16. For example, the server 24 may process the RF signals 20 and log the return of a particular tag 14 (into a particular reclamation receptacle 16) into the history of the tag 14. As discussed, in some embodiments, the server 24 may process RF signals 20 to determine which reclamation receptacle 16 the tag 14 has been deposited, and this information may also be logged into the history of the tag 14.

One or more embodiments of the reclamation receptacle 16 are provided in FIGS. 2-6, which each illustrate a different view and/or portion of an example reclamation receptacle 16. Beginning first with FIG. 2, the reclamation receptacle 16 includes a lid portion 30 and a containment portion 32, referred to as the lid 30 and the bin 32, respectively. The bin 32 may be suitable for containing one or more RFID tags 14 deposited into the reclamation receptacle 16, and the lid 30 may be suitable for covering and/or sealing one end of the bin 32 when the reclamation receptacle 16 is in a closed configuration. Portions of the bin 32 and the lid 30 may include materials which block the transmission of IR signals out of the reclamation receptacle 16 but allow the transmission of RF signals through the reclamation receptacle 16. For example, such materials may include any IR-opaque plastics which prevent IR transmission but allow RF transmission.

To deposit an RFID tag 14 into the reclamation receptacle 16, a user (e.g., a patient or a medical facility staff) may insert the tag 14 against the door 34 and allow the tag 14 to drop into the bin 32. The door 34 may be coupled to an angled doorstop 36 which may be shaped or configured to prevent or reduce the transmission of IR signals out of the reclamation receptacle 16 when the door 34 is open. In some embodiments, the door 34 is spring loaded, and further, in some embodiments, the door 34 is a magnetized door 34, and the angled doorstop 36 is also magnetized. In such embodiments, the door 34 and the angled doorstop 36 may generally remain magnetically coupled unless the door 34 is pushed open (e.g., when a tag 14 is being inserted against the door 34). Alternatively, in some embodiments, the angled doorstop 36 may be part of the door 34, and the angled portion 36 of the door 34 may be configured to rest against the bin 32 when the door 34 is not open. For instance, the door 34 may be spring loaded, and/or the angled portion 36 of the door 34 and the bin 32 may be magnetized to couple the angled portion 36 of the door 34 to the bin 32, unless the door 34 is pushed open. In some embodiments, the angular shape of the angled portion 36 of the door 34 or the angled doorstop 36 may be configured to visually indicate where a tag 14 may be inserted and/or to assist with the mechanics of opening the door 34.

Figure 3:
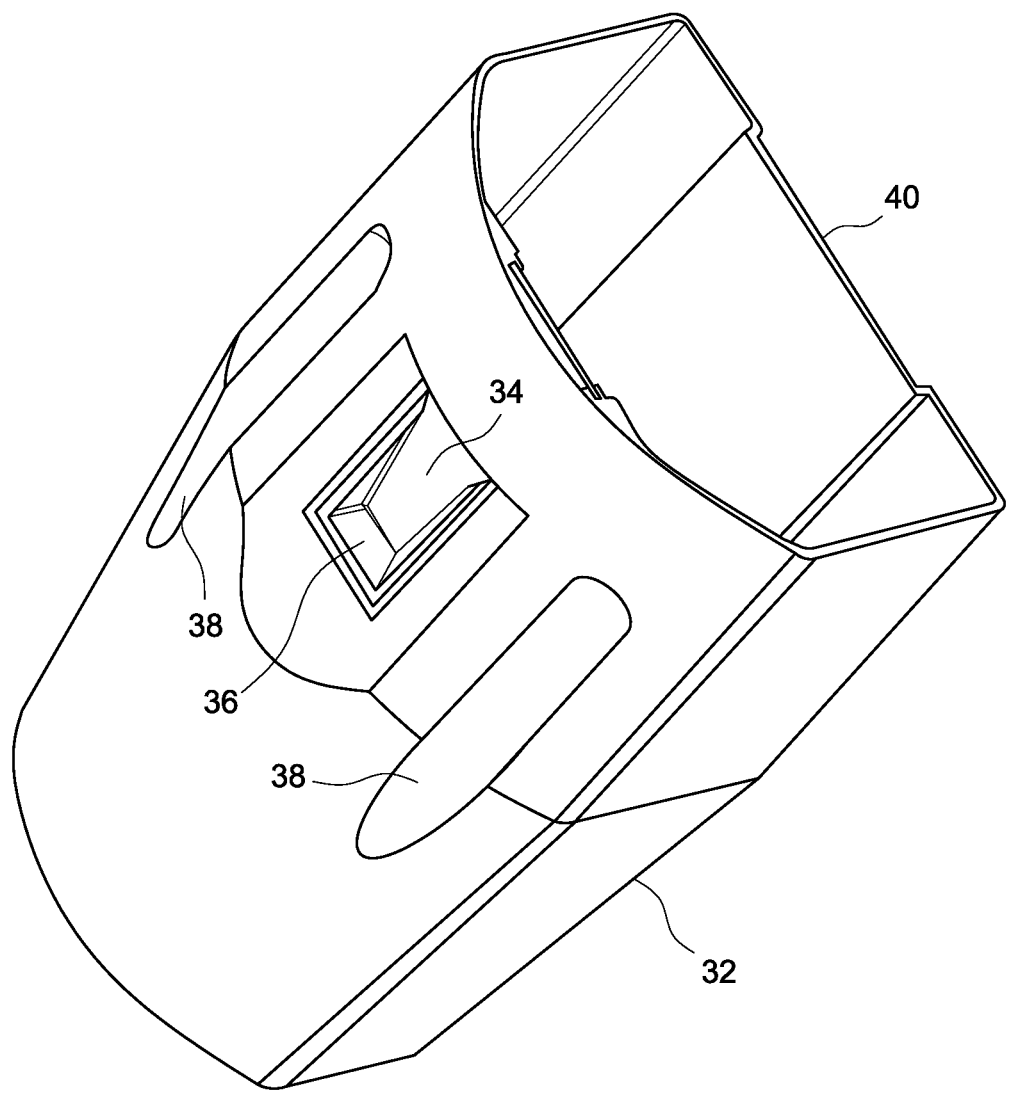
FIG. 3 is a front perspective view of a bin of the reclamation receptacle in accordance with an embodiment.
Figure 4:
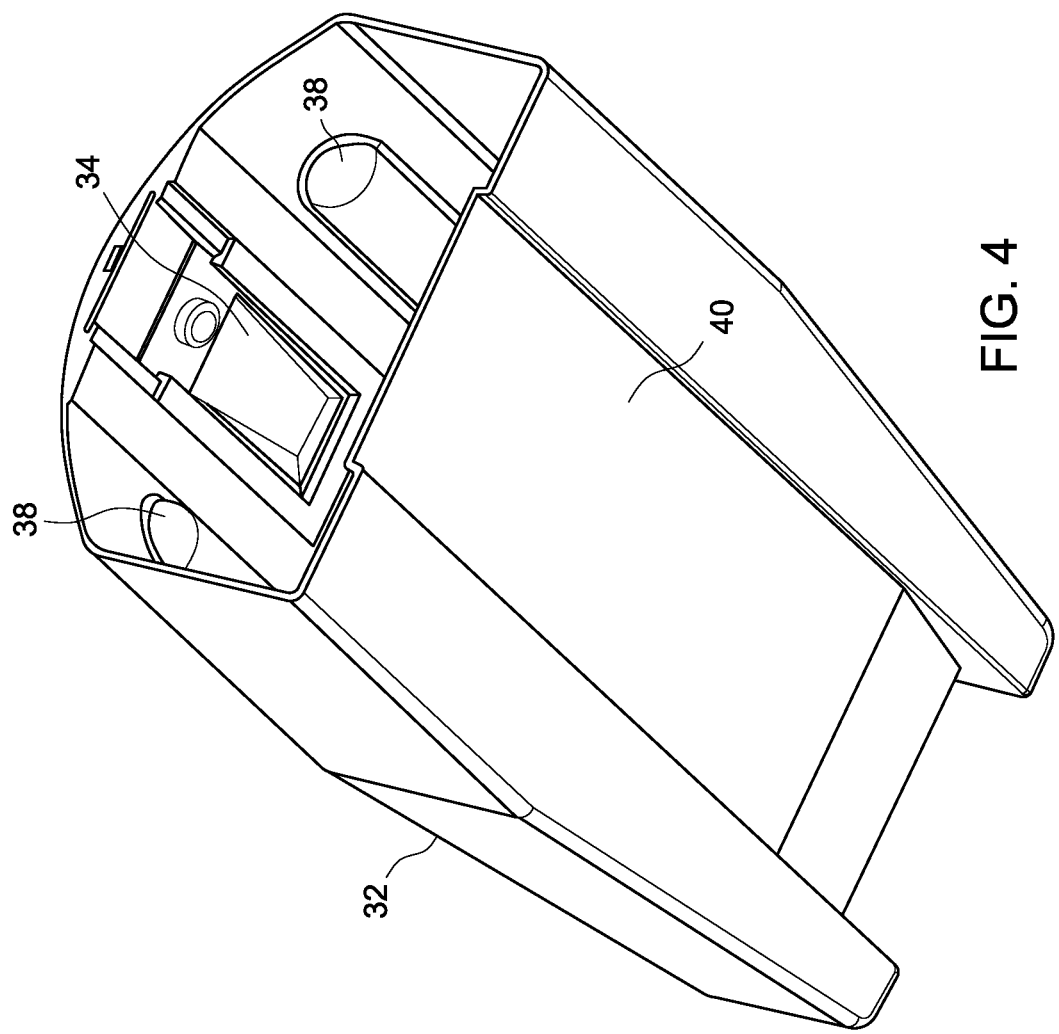
FIG. 4 is a back perspective view of the bin of FIG. 3 in accordance with an embodiment.

One or more RFID tags 14 may be deposited into a reclamation receptacle 16, and the reclamation receptacle 16 may be opened to allow retrieval of the deposited tag(s) 14. To open the reclamation receptacle 16, the bin 32 and the lid 30 may be separated. For example, a user may separate the bin 32 from the lid 30 by pulling and/or sliding the bin 32 using grooves 38, or any other indentation, handle, or surface, etc., which may enable a user to separate the bin 32 from the lid 30. Illustrations of a bin 32 separated from the lid 30 are provided in FIGS. 3 and 4. Specifically, FIG. 3 provides a front view and FIG. 4 provides a back view of the bin 32 separated from the lid 30. As illustrated in FIGS. 3 and 4, RFID tags 14 deposited through the door 34 may be retrieved from the top opening of the bin 32 otherwise covered by the lid 30 in a closed configuration of the reclamation receptacle 16. Furthermore, as illustrated in FIGS. 3 and 4, the bin 32 may have a recessed back 40 suitable for coupling with the lid 30.

Figure 5:
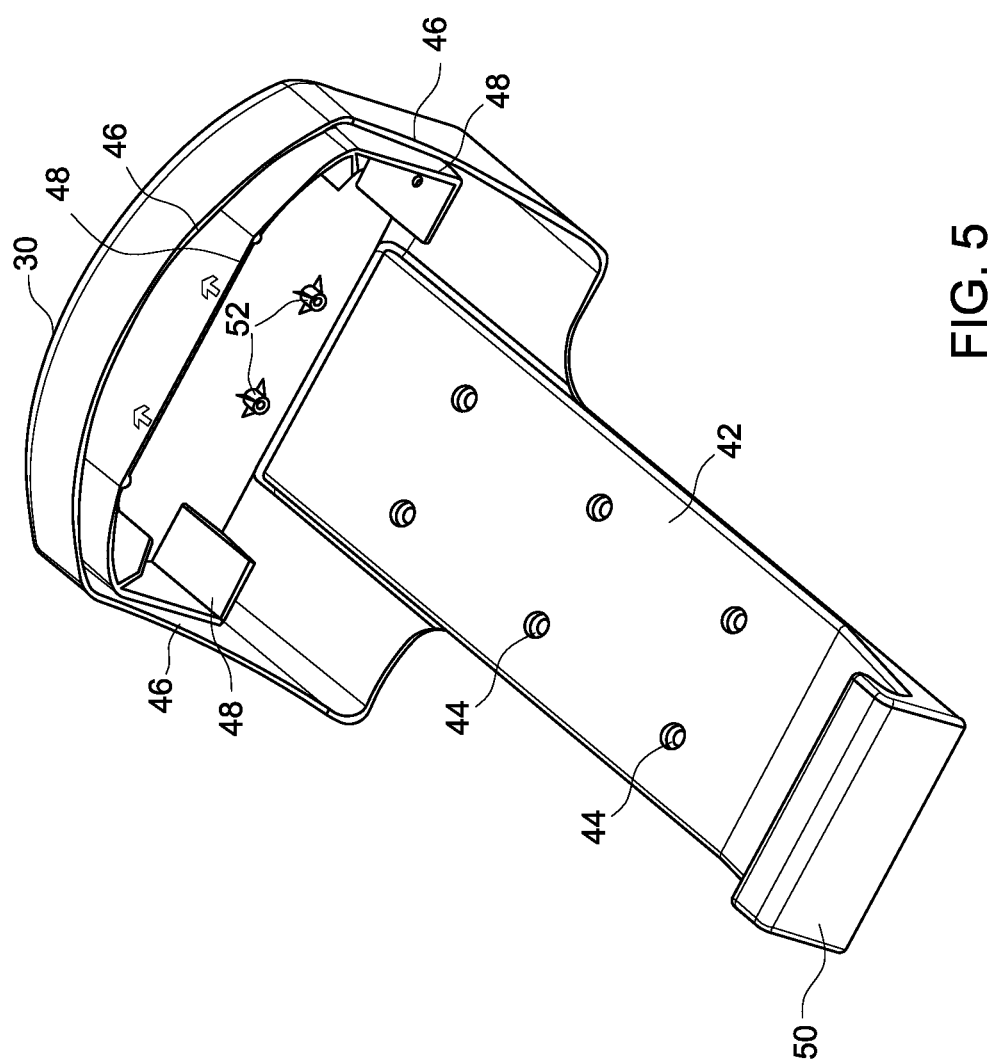
FIG. 5 is an illustration of a lid of the reclamation receptacle in accordance with an embodiment.
Figure 6:
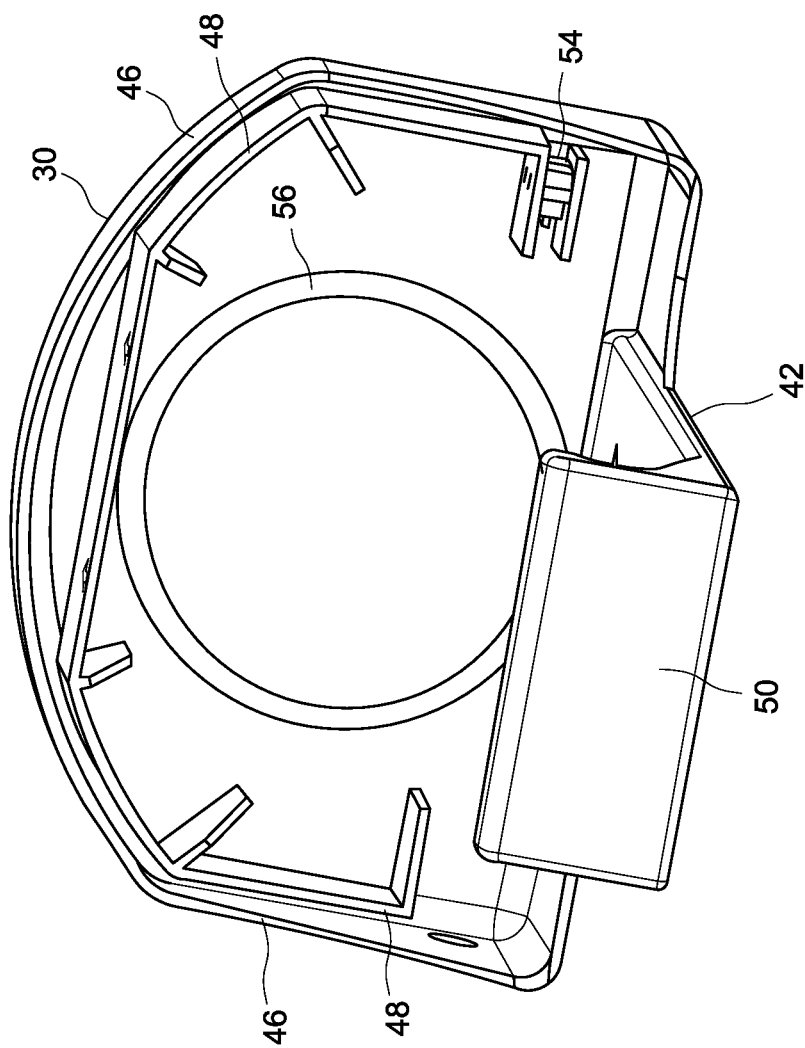
FIG. 6 is a view from the underside of the lid in FIG. 5 in accordance with an embodiment.

Illustrations of the lid 30 separated from the bin 32 are provided in FIGS. 5 and 6, where FIG. 5 provides a front view of the lid 30 and FIG. 6 provides a view of the underside of the lid 30. As illustrated in FIG. 5, the lid 30 may include a back panel 42 for coupling with the recessed back 40 of the bin 32. The back panel may include one or more holes 44 designed to allow the lid 30 to be mounted to a surface (e.g., a wall, door, desk, etc.). For example, the lid 30 may be mounted to a wall via fasteners (e.g., screws) using the holes 44, and the bin 32 may be fitted to the lid 30 such that the reclamation receptacle 16 is wall-mounted and available for receiving RFID tags 14.

The lid 30 may include other components for fitting with the bin 32 in a closed configuration. For example, the back panel 42 may extend into a bottom lip 50 which holds a bottom surface of the bin 32. The angled bottom portion of the recessed back 40 of the bin 32, as illustrated in FIG. 4, may fit with the bottom lip 50 of the lid 30 to support the position of the bin 32 with the lid 30. The lid 30 may also have a top portion with an outer perimeter 46 and an inner perimeter 48. The edge of the top opening of the bin 32 may fit in the space between the outer and inner perimeters 46 and 48 of the lid 30. Furthermore, the top portion of the lid 30 may include other structures, such as the mounting holes 52 that facilitate installation of an IR transmitter 56.

A view from the underside of the lid 30 is provided in FIG. 6. As illustrated in FIG. 6, the lid 30 may include an IR transmitter 56. When the IR transmitter 56 is in an active state, the transmitter 56 may transmit IR signals 18 within the reclamation receptacle 16. In some embodiments, the IR transmitter 56 may transmit IR signals 18 continuously, and in other embodiments, the IR transmitter 56 may transmit IR signals 18 periodically. As will be discussed, the IR signals 18 (FIG. 1) may be received by one or more RFID tags 14 deposited in the reclamation receptacle 16, and the RFID tags 14 which receive the IR signals 18 may generate an RF signal 20 in response to the IR signals 18. The RF signal 20 may be transmitted to an RTLS server 24 and indicate to the system 10 that the RFID tag 14 which generated the RF signal 20 has been deposited at a reclamation receptacle 16. While the IR transmitter 56 is located in the lid 30 in one embodiment, as illustrated in FIG. 6, in other embodiments, the IR transmitter 56 may also be located in the bin 32.

As an RFID tag 14 may generate a RF signal 20 in response to receiving the IR signal 18 generated by the IR transmitter 56, it may be advantageous to prevent a tag 14 from receiving an IR signal 18 until or unless the tag 14 has been deposited in the reclamation receptacle 16. If a tag 14 generates an RF signal 20 in response to a received IR signal 18 but has not actually been deposited at a reclamation receptacle 16, the received RF signals 20 acquired from the tag 14 may result in inaccurate location and/or status information. For example, if a person 12 wearing a first tag 14 is moving near a reclamation receptacle 16, and the first tag 14 happens to receive IR signals 18 leaked or transmitted from the reclamation receptacle 16, the first tag 14 may generate an RF signal 20 in response to the received IR signals 18 to indicate that the first tag 14 has been returned to the reclamation receptacle 16. However, as the first tag 14 has not actually been deposited into the reclamation receptacle 16, the system 10 may incorrectly log, based on the received RF signals 20 transmitted by the first tag 14, that the first tag 14 has been returned.

Such potential inaccuracies in the system 10 may be at least partially addressed by using IR-opaque materials and an angled doorstop 36, as previously discussed. However, unintended IR transmissions may also occur when the lid 30 is separate from the bin 32. When the lid 30 is separate from the bin 32 (such as when a medical facility staff member is retrieving tags 14), an IR transmitter 56 located in either the lid 30 or the bin 32 may no longer be enclosed within the reclamation receptacle 16 and may freely transmit IR signals 18 out of the reclamation receptacle 16 at a certain range. For example, if a medical facility staff removes the bin 32 from the lid 30 in a relatively busy hallway, an unprotected and active IR transmitter 56 may transmit IR signals 18 to all RFID tags 14 within a range of the IR transmitter 56. As a result, all RFID tags 14 which receive the IR signals 18 may generate an RF signal 20 which indicates that the tags 14 have been returned to the reclamation receptacle 16 with the unprotected IR transmitter 56. The location information which results from the mistakenly prompted RF signals 20 may be inaccurate, as none of the nearby tags 14 outside of the bin 32 were intentionally deposited into the reclamation receptacle 16.

As such, one or more embodiments also include techniques for deactivating the IR transmitter 56 when the lid 30 is separate from the bin 32. As illustrated in FIG. 6, the lid 30 may include a sensor 54 which senses when the lid 30 is closed on the bin 32. In some embodiments, the sensor 54 may be a contact sensor or any other sensor 54 suitable for sensing when the reclamation receptacle 16 is in an open configuration or in a closed configuration. In other embodiments, the sensor 54 may be located in different areas of the reclamation receptacle 16. For example, the both the IR transmitter 56 and the sensor 54 could be located in the bin 32, rather than in the lid 30 as illustrated in FIG. 6. In one embodiment, a sensor may be coupled to the door 34 and/or the doorstop 36, and the IR transmitter 56 may be disabled when the sensor at the door 34 senses that the door 34 is open and enabled with the sensor senses that the door 34 is closed.

When the sensor 54 senses that the reclamation receptacle 16 is in an open configuration, the IR transmitter 56 may be deactivated, and when the sensor 54 senses that the reclamation receptacle 16 is in a closed configuration, the IR transmitter may again be activated. Therefore, the IR opaque materials of the reclamation receptacle 16 may prevent or reduce transmission of IR signals 18 out of the reclamation receptacle 16 when the reclamation receptacle 16 is in a closed configuration, and the sensing of the open configuration and deactivation of the IR transmitter 56 may prevent or reduce the transmission of IR signals 18 when the reclamation receptacle 16 is in an open configuration.

In other embodiments, the reclamation receptacle 16 may have different configurations and is not limited to configurations including a lid 30 and bin 32. For example, the reclamation receptacle 16 may have drawers which may be pulled out for retrieval of deposited tags 14. In one embodiment, a sensor may be coupled to the drawer and may be configured to sense when the drawer is open or closed. The sensor may cause an IR transmitter 56 to deactivate when the drawer is open and activate when the drawer is closed, thus controlling and/or reducing the amount of IR signals transmitted from an open drawer of the reclamation receptacle 16. Furthermore, in some embodiments, openings of the reclamation receptacle 16 may include a lock. For example, a lock may be employed to remove the bin 32 from the lid 30 or to pull out a drawer from the remainder of the reclamation receptacle 16. In some embodiments, a sensor may be coupled to the lock, such that unlocking the lock may result in deactivating the IR transmitter, and locking the lock may result in activating the IR transmitter 56.

Figure 7:
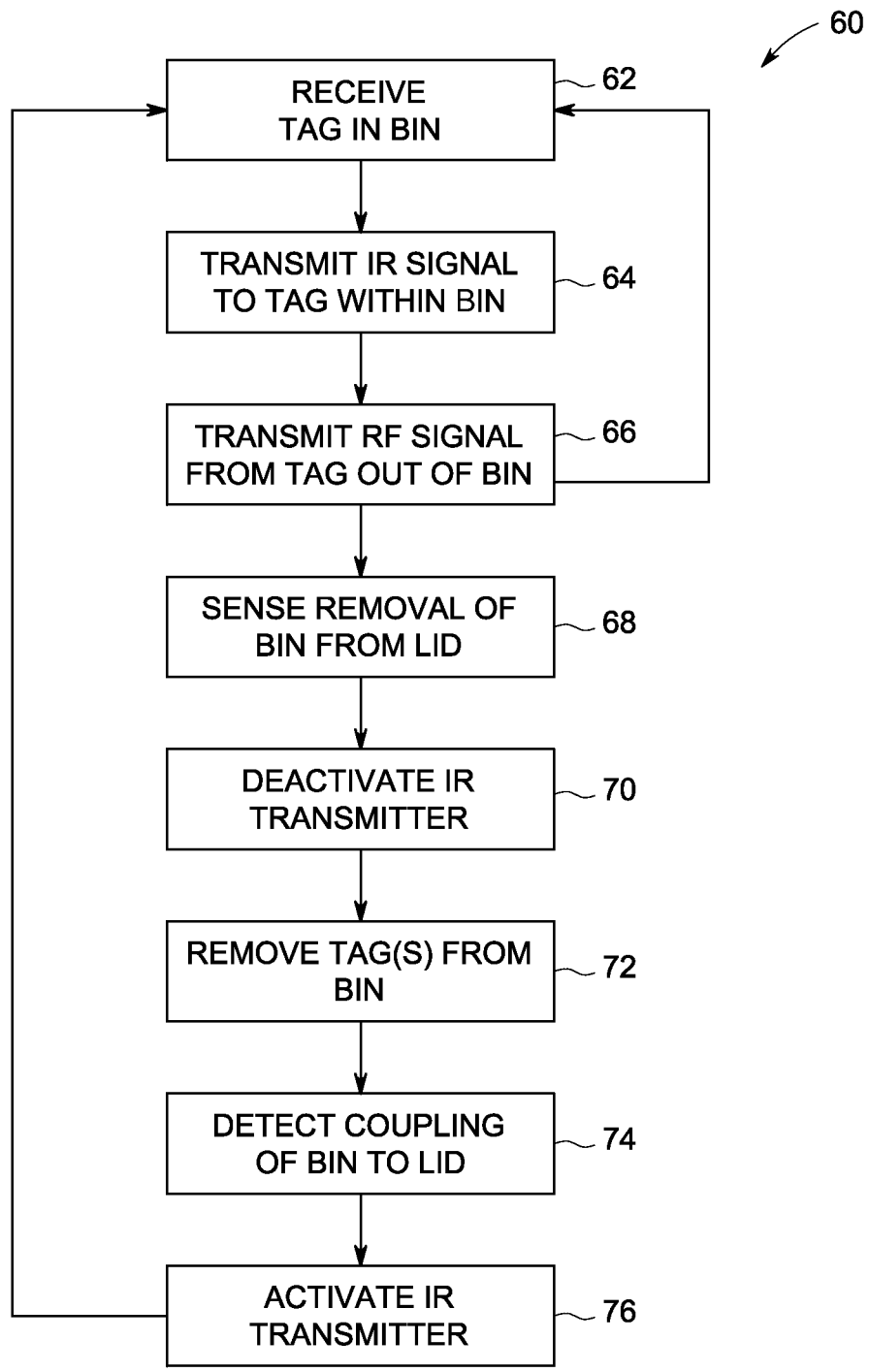
FIG. 7 is a flow chart describing a method of operating the reclamation receptacle in accordance with an embodiment.

The flow chart of FIG. 7 provides a summary of a process for operating and/or managing a reclamation receptacle 16 in some embodiments of the present techniques. The process 60 includes receiving (block 62) an RFID tag 14 in the reclamation receptacle 16. The reclamation receptacle 16 may be closed, and the IR transmitter 56 may be actively transmitting (block 64) IR signals 18 within the reclamation receptacle 16. The RFID tag 14 deposited in the bin 32 may receive the IR signals 18 and may generate and transmit (block 66) RF signals 20. As discussed, the reclamation receptacle 16 may be IR-opaque, such that the IR signals 18 transmitted by the IR transmitter 56 may be contained within the reclamation receptacle 16. However, the reclamation receptacle 16 may still allow the transmission of RF signals 20 out of the reclamation receptacle 16. In one embodiment, multiple tags 14 may be received at any one reclamation receptacle 16.

The RFID tag(s) 14 deposited in a reclamation receptacle 16 may occasionally be retrieved (e.g., by a medical facility staff). To retrieve the tag(s) 14, the bin portion 32 of the reclamation receptacle 16 may be removed from the lid portion 30. As transmission of IR signals 18 outside of the reclamation receptacle 16 may be undesirable, present techniques may involve sensing (block 68) the removal of the bin 32 from the lid 30 and deactivating (block 70) the IR transmitter 56 when a sensor 54 senses the removal of the bin 32 from the lid 30. Once the bin 32 has been removed, the deposited RFID tag(s) 14 may be removed (block 72) from the bin 32, and the bin 32 may be replaced to again couple with the lid 30. The sensor may detect (block 74) the proper coupling of the bin 32 with the lid 30 and may again activate (block 76) the IR transmitter 56 so that the reclamation receptacle 16 is again suitable for receiving additional RFID tags 14.

While medical facilities are used to explain the present techniques, it should be noted that the present techniques are applicable to other systems and/or facilities and are not limited to medical facilities. For example, in accordance with the present techniques, embodiments of the reclamation receptacle 16 may be used to collect other types of devices or tags which receive IR signals and transmit RF signals in response to the IR signals in various other settings. For example, the present techniques may be used for tracking laboratory equipment. Laboratory equipment in inventory may be tagged, and when equipment is taken for use, the tag 14 may be removed and placed in a reclamation receptacle 16. In some embodiments, the reclamation receptacle 16 may also be used to track vehicles in a large area (e.g., a parking garage, vehicle auction yard, etc.). When a vehicle is retrieved, its tag 14 may be removed and placed in a corresponding reclamation receptacle 16 to indicate that the vehicle has been retrieved from a particular location in the area.

In some embodiments, technical effects of the present subject matter may include, among others, reducing the transmission of IR signals outside of a reclamation receptacle. Reducing the transmission of IR signals from a reclamation receptacle using IR-opaque materials and deactivating IR transmissions when the reclamation receptacle is open may reduce the probability of unintended IR transmissions to RFID tags which have not been deposited within the reclamation receptacle. Further, another technical effect may include improving the accuracy of location data in an RTLS system by reducing errors associated with the improper containment of IR signals generated by a reclamation receptacle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a reclamation receptacle comprising an infrared (IR) transmitter configured to transmit IR signals when the reclamation receptacle is in a closed configuration and configured to cease transmission of the IR signals when the reclamation receptacle is in an open configuration; and
a radio frequency identification (RFID) tag configured to fit in the reclamation receptacle, wherein the RFID tag is configured to receive the IR signals and generate a radio frequency (RF) signal in response to the IR signals, wherein the RF signal indicates that the RFID tag is in the reclamation receptacle.

2. The system of claim 1, wherein the reclamation receptacle is configured to contain the IR signals within the reclamation receptacle and allow the transmission of RF signals out of the reclamation receptacle.

3. The system of claim 1, wherein the reclamation receptacle comprises one or more IR-opaque plastics.

4. The system of claim 1, wherein the reclamation receptacle comprises a bin portion removably coupled to a lid portion, wherein the reclamation receptacle is in the closed configuration when the bin portion is coupled to the lid portion and the reclamation receptacle is in the open configuration when the bin portion is removed from the lid portion.

5. The system of claim 1, wherein the reclamation receptacle comprises a sensor configured to sense when the reclamation receptacle is in the closed configuration or the open configuration.

6. The system of claim 1, wherein the reclamation receptacle comprises a door in a bin portion of the reclamation receptacle, and wherein the RFID tag is configured to fit through the door into the bin portion of the reclamation receptacle.

7. The system of claim 6, wherein the door is magnetic and is biased to a closed position against the bin portion.

8. The system of claim 6, wherein the door comprises an angled portion, and wherein the door is biased such that the angled portion is coupled to the bin portion.

9. The system of claim 1, comprising more than one reclamation receptacle, wherein each of the more than one reclamation receptacles is configured to transmit a unique IR signal within each reclamation receptacle.

10. The system of claim 9, comprising a plurality of RFID tags, wherein each RFID tag is configured to generate a unique RF signal based on the unique IR signal received by one of the more than one reclamation receptacles.

11. A reclamation receptacle comprising:
a bin configured to contain one or more radio frequency identification (RFID) tags;
a lid removably coupled to the bin;
an infrared (IR) transmitter configured to activate when the bin is coupled to the lid and configured to deactivate when the bin is removed from the lid; and
a sensor configured to sense when the bin is coupled to the lid and sense when the bin is removed from the lid.

12. The reclamation receptacle of claim 11, wherein the bin and the lid both comprise materials which are IR-opaque and radio frequency (RF) transmissive.

13. The reclamation receptacle of claim 11, wherein the bin comprises a door configured to receive an RFID tag into the reclamation receptacle, wherein the door is configured to block IR signals from propagating out of the reclamation receptacle.

14. The reclamation receptacle of claim 13, wherein the bin comprises a door having an angular portion configured to block IR signals from propagating out of the reclamation receptacle when the door is open.

15. The reclamation receptacle of claim 11, wherein the lid is configured to be mountable to a flat surface.

16. The reclamation receptacle of claim 11, wherein the IR transmitter is configured to transmit an IR signal to one or more RFID tags in the reclamation receptacle.

17. The reclamation receptacle of claim 11, wherein the IR transmitter is configured to transmit an IR signal indicative of the reclamation receptacle.

18. A method comprising:
receiving a radio frequency identification (RFID) tag at a reclamation receptacle;
transmitting infrared (IR) signals from an IR transmitter within the reclamation receptacle to the received RFID tag;
generating a radio frequency (RF) signal by the RFID tag based on the received IR signals;
removing a bin of the reclamation receptacle from the remainder of the reclamation receptacle;
sensing the removal of the bin; and
deactivating the IR transmitter in response to the sensing of the removal of the bin.

19. The method of claim 18, comprising sensing the coupling of the bin to the remainder of the reclamation receptacle and activating the IR transmitter in response to the sensing of the coupling of the bin to the remainder of the reclamation receptacle.

20. The method of claim 18, comprising preventing IR signals from being transmitted out from the reclamation receptacle.

21. The method of claim 18, comprising allowing RF signals to be transmitted out from the reclamation receptacle.

* * * * *